(12) United States Patent
Nillesen

(10) Patent No.: US 6,870,748 B2
(45) Date of Patent: Mar. 22, 2005

(54) METHOD AND APPARATUS FOR CONTROLLING THE POWER SUPPLIED TO A LOAD

(75) Inventor: Martijn E. Nillesen, Velden (NL)

(73) Assignee: Océ-Technologies B.V., Venlo (NL)

( * ) Notice: Subject to any disclaimer, the term of this patent is extended or adjusted under 35 U.S.C. 154(b) by 56 days.

(21) Appl. No.: 10/606,361

(22) Filed: Jun. 26, 2003

(65) Prior Publication Data

US 2004/0125625 A1 Jul. 1, 2004

(30) Foreign Application Priority Data

Jun. 28, 2002 (EP) ............................................. 02078187

(51) Int. Cl.[7] .................................................. H02M 1/12
(52) U.S. Cl. ........................................ 363/44; 363/125
(58) Field of Search ............................. 363/39, 44, 46, 363/125, 126

(56) References Cited

U.S. PATENT DOCUMENTS

| 4,178,629 | A | * | 12/1979 | Allen et al. .................... 363/96 |
| 4,933,831 | A | * | 6/1990 | Takahashi et al. .......... 363/132 |
| 5,673,184 | A | | 9/1997 | Rilly et al. |
| 5,740,022 | A | | 4/1998 | Abe |
| 5,856,917 | A | | 1/1999 | Aonuma et al. |
| 6,061,259 | A | | 5/2000 | DeMichele |
| 6,114,669 | A | | 9/2000 | Van Mil et al. |
| 6,225,755 | B1 | * | 5/2001 | Shen ........................... 315/247 |
| 2004/0158801 | A1 | * | 8/2004 | Leisten et al. .................. 716/1 |

* cited by examiner

*Primary Examiner*—Adolf Berhane
(74) *Attorney, Agent, or Firm*—Birch, Stewart, Kolasch & Birch, LLP

(57) ABSTRACT

An apparatus for controlling the power supplied from an AC power supply to an ohmic load, includes a switch for connecting the load to the AC power supply, a controller for providing a control signal to the switch, and a rectifier bridge having an input and an output. The input is adapted for connection to the AC power supply and the output is connected to a series connection of a first inductor, the load and the switch. The controller provides a control signal with a frequency which is at least 500 times higher than the frequency of the AC power supply. The switch is switched on and off by the control signal. The controller comprises a control element for varying the duty cycle of the control signal.

13 Claims, 5 Drawing Sheets

METHOD AND APPARATUS FOR CONTROLLING THE POWER SUPPLIED TO A LOAD

The present application claims, under 35 U.S.C. § 119, the priority benefit of European Patent Application No. 02078187.8 filed Jun. 28, 2002, the entire contents of which are herein fully incorporated by reference.

BACKGROUND OF THE INVENTION

1. Field of the Invention

The invention relates to a method for controlling the power supplied from an AC power supply to an ohmic load, the AC power supply providing a sinusoidal output, the method comprising connecting the load to the AC power supply during a part of each period of the sinusoidal output, wherein the power supplied from the AC power supply to the load is varied by varying the duration of that part of each period. The invention further relates an apparatus for controlling the power supplied from an AC power supply to an ohmic load, comprising a switch for connecting the load to the AC power supply, and a controller for providing a control signal to the switch.

2. Discussion of the Related Art

U.S. Pat. No. 6,114,669 is directed to a method and apparatus for controlling power to a load, wherein a controller operates according to a so-called phasecut control method. Within each half period of the AC voltage, a switch is closed for connecting the load to an AC power supply and at a zero-cross of the AC voltage, the switch opens again. In this known apparatus, flicker and interference radiation are reduced by varying the phase angle of the control signal around a phase angle corresponding to the power to be provided.

Although the known apparatus allows the load to be gradually connected to the AC power supply, a phasecut control method shows the disadvantage that the control steps are relatively large, whereas phase cutting is inaccurate at small phase angles in particular. Moreover, the phasecut control method causes harmonic distortion resulting in a relatively low value of the power factor.

SUMMARY OF THE INVENTION

The invention aims to provide a method and apparatus for controlling power supplied from an AC power supply to an ohmic load, which meet high requirements regarding harmonic distortion and flicker.

According to the invention, the method is provided in that the sinusoidal output is rectified and the rectified output is delivered to a series connection of a first inductor and the load, wherein the load is connected to and disconnected from the AC power supply at a frequency which is at least 500 times higher than the frequency of the AC power supply, wherein the power supplied from the AC power supply to the load is varied by varying the time ratio of connecting/disconnecting the load.

The apparatus of the invention includes a rectifier bridge having an input and an output, the input being adapted for connection to the AC power supply and the output being connected to the series connection of the first inductor, the load and the switch, wherein the controller provides a control signal with a frequency which is at least 500 times higher than the frequency of the AC power supply, wherein the switch is switched on and off by the control signal, and wherein the controller comprises a control element for varying the duty cycle of the control signal.

In this manner, a method and apparatus for controlling power supplied from an AC source to a load are obtained, wherein the high-frequency distortion caused by the high-frequency switching of the switch can be suppressed in an effective manner by using the ohmic character of the load in an advantageous manner in a suppressing circuit with the inductor. The significant reduction of harmonic distortion results in a power factor which approximates the desired value of 1. Further, the high-frequency switching allows a linear control of the time ratio of connecting/disconnecting the load over the complete range of 0–100%. The control steps can be very small. The apparatus can be designed for a range of output voltages and frequencies of the AC power supply.

The method and apparatus according to the invention can be used in various applications such as in heat control equipment, light dimmers, and the like.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be further explained by reference to the drawings in which an embodiment of the apparatus of the invention is schematically shown.

DETAILED DESCRIPTION OF THE PREFERRED EMBODIMENTS

Figure 1:
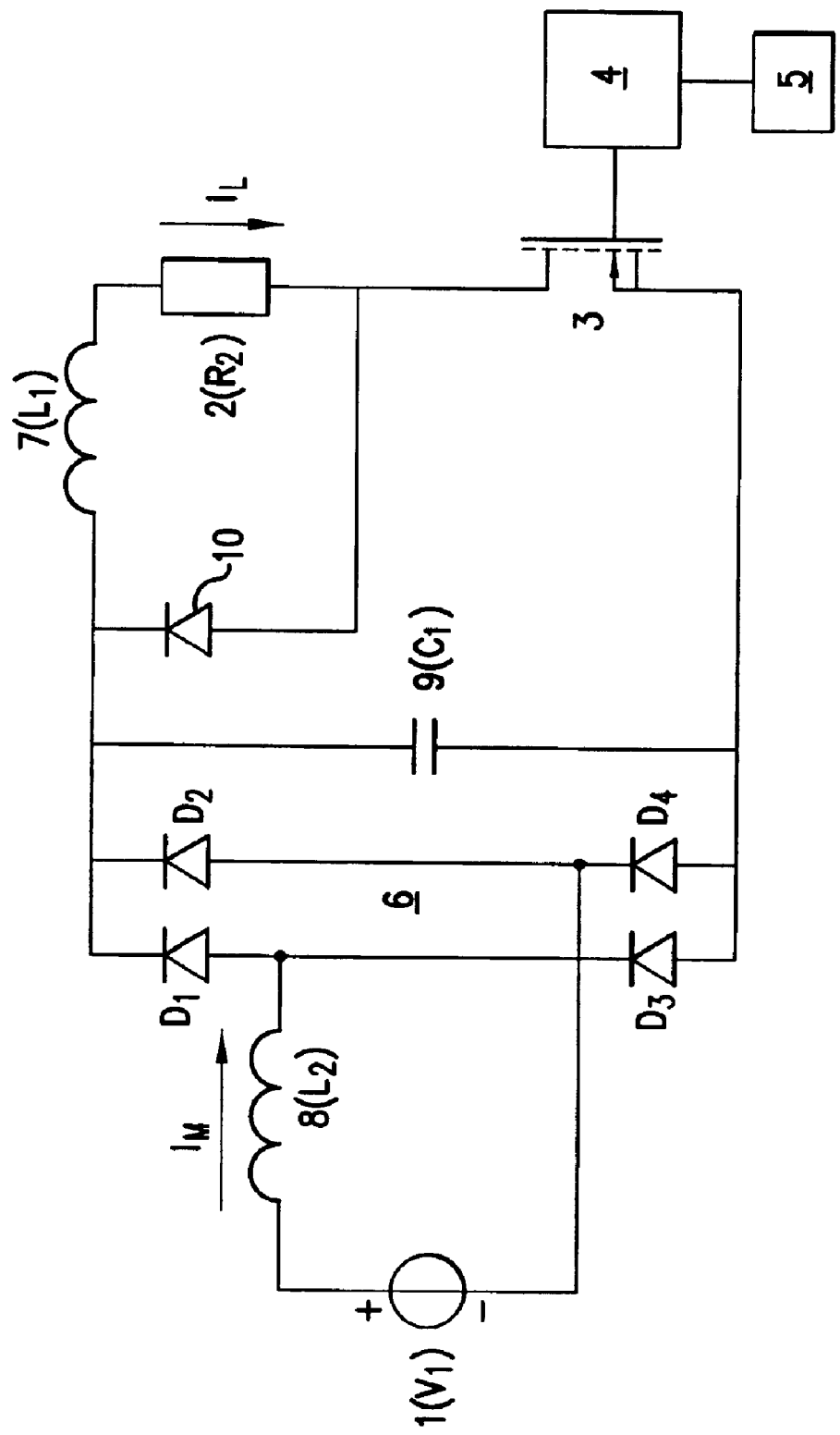
FIG. 1 shows a schematical circuit diagram of an embodiment of an apparatus for controlling power supplied from an AC source to a load according to the invention.

Referring to FIG. 1 there is shown a circuit diagram of an embodiment of an apparatus for controlling the power supplied from an AC power supply 1 to an ohmic load 2. The AC power supply 1 provides a sinusoidal output voltage and current. The apparatus comprises a switch 3 for selectively connecting the load 2 to the power supply 1. In the embodiment shown, a FET, more particularly a MOSFET, is used as the switch 3. However it will be understood that any other suitable type of switch can be used, for example an IGBT, a transistor, etc.

A controller 4 provides a control signal to the switch 3 for switching the switch 3 on and off. The control signal has a fixed frequency and a variable duty cycle. The frequency of the control signal is preferably at least 500 times higher than the frequency of the AC power supply 1. For instance, if a standard frequency of the power supply 1 is 50 Hz, the frequency of the control signal is at least 25 kHz. In one embodiment, preferably, the frequency of the control signal is in the range of 50–250 kHz. In this manner the load 2 is connected to and disconnected from the AC power supply 1 a number of times within each period of the AC output voltage.

The controller 4 comprises a control element 5 for varying the duty cycle of the control signal applied to the switch 3. The duty cycle can be varied from 0 up to 100% thereby varying the power supplied from the power supply 1 to the load 2 from 0 to 100%. The control element 5 can be a manually adjustable element or any other suitable element. As an alternative the control element 5 can be part of an electronic controlling circuit which controls the duty cycle in dependence on one or more input signals received from sensors.

In the embodiment of FIG. 1 the apparatus further comprises a rectifier bridge 6 having an output connected to a series connection of a first inductor 7 ($L_1$), the ohmic load 2 ($R_2$) and the switch 3. The input of the rectifier bridge 6 is connected to the AC power supply 1 through a second inductor 8 ($L_2$). In this example, the rectifier bridge 6 is composed of four diodes $D_1$–$D_4$.

A freewheeling element made as a capacitor 9 ($C_1$) is connected to the output of the rectifier bridge 6 parallel to the series connection of the inductor 7, the load 2 and the switch 3. As an alternative the capacitor 9 could also be connected to the input of the rectifier bridge 6. Preferably the capacitor 9 is connected to the output of the rectifier bridge 6 as shown in FIG. 1 since in this manner, high-frequency paths in the circuit can be reduced thereby reducing EMC radiation. Moreover when the switch 3 is switched off, no unnecessary capacitive current will flow.

A further freewheeling element 10 is connected parallel to the series connection of the first inductor 7 and the load 2. In the embodiment shown the freewheeling element 10 is a diode of a very fast recovery type.

In operation, the ohmic load 2 receives a rectified sinusoidal voltage having an amplitude which is controlled by the duty cycle of the switch 3 according to the duty cycle of the control signal. FIGS. 2–5 show different examples of an operation of the circuit in FIG. 1 according to an embodiment of the present invention. In the phase shown in FIG. 2 wherein voltage V1 of the power supply 1 is positive (i.e., in a positive cycle of a sinusoidal signal) and the switch 3 is closed, the current $I_L$ through the load 2 ($R_2$) will increase until the switch 3 is switched off. In the next phase shown in FIG. 3, wherein the voltage V1 is still positive and the switch 3 is open, the load current $I_L$ will be reduced. In this phase the load 2 will dissipate the energy stored in the inductor 7 ($L_1$) in the circuit closed through the freewheeling element 10. During this phase the capacitor 9 ($C_1$) operates as a freewheeling element for the inductor 8 ($L_2$).

Figure 2:
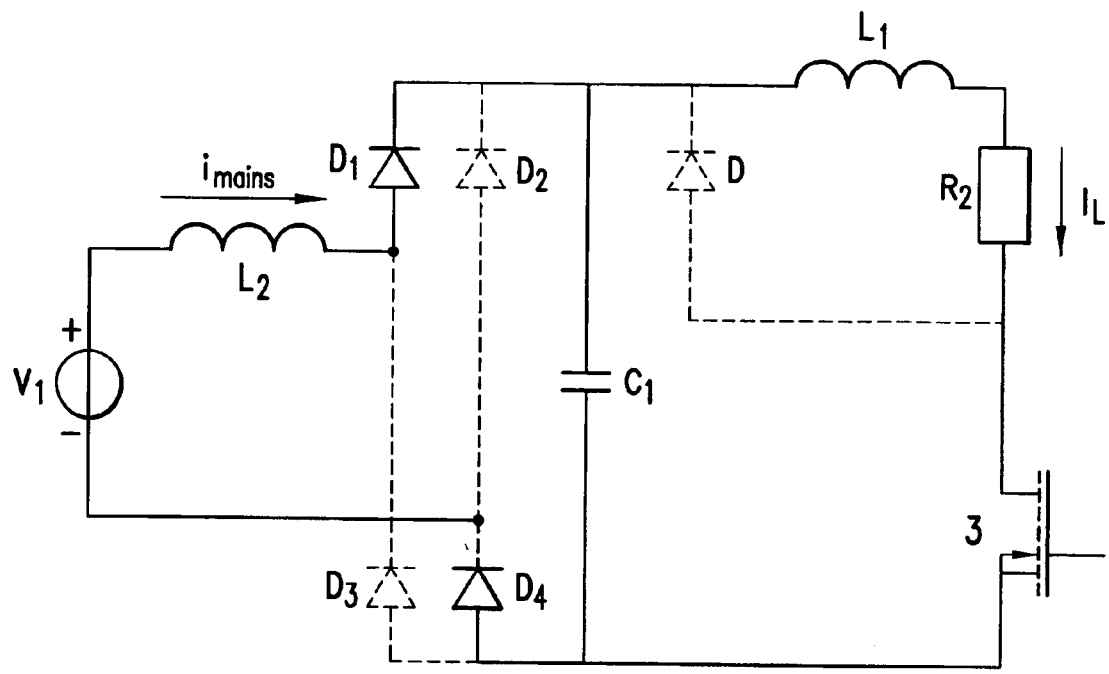
FIGS. 2–5 show examples of the current flow in the circuit diagram of FIG. 1 for four different cases during one period of the AC voltage of the AC power supply.
Figure 3:
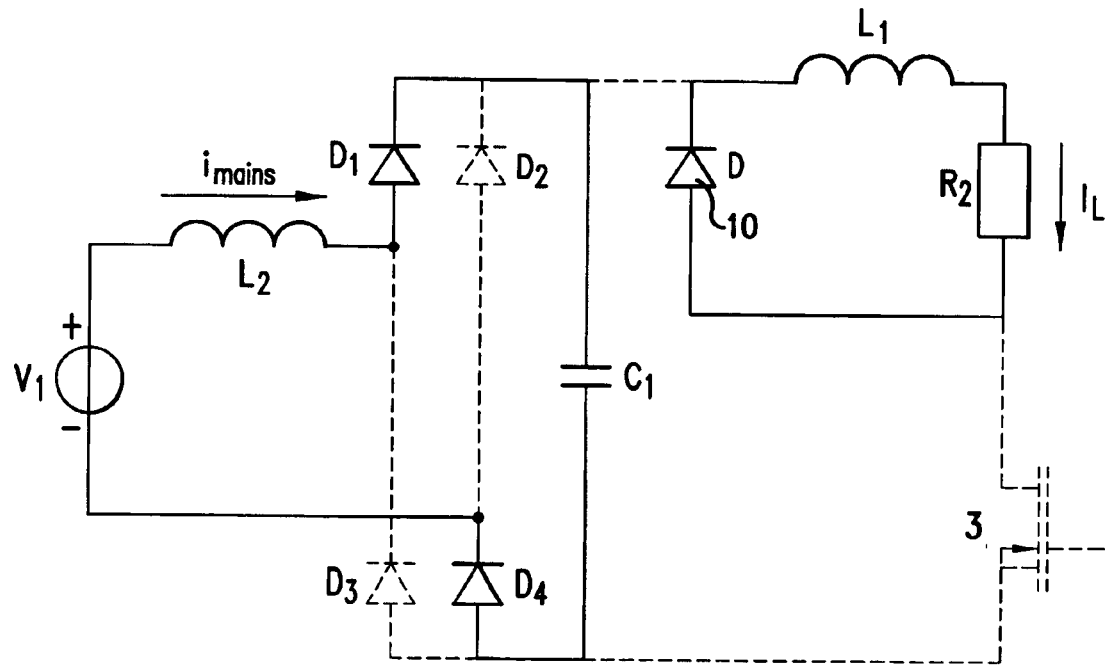
Figure 4:
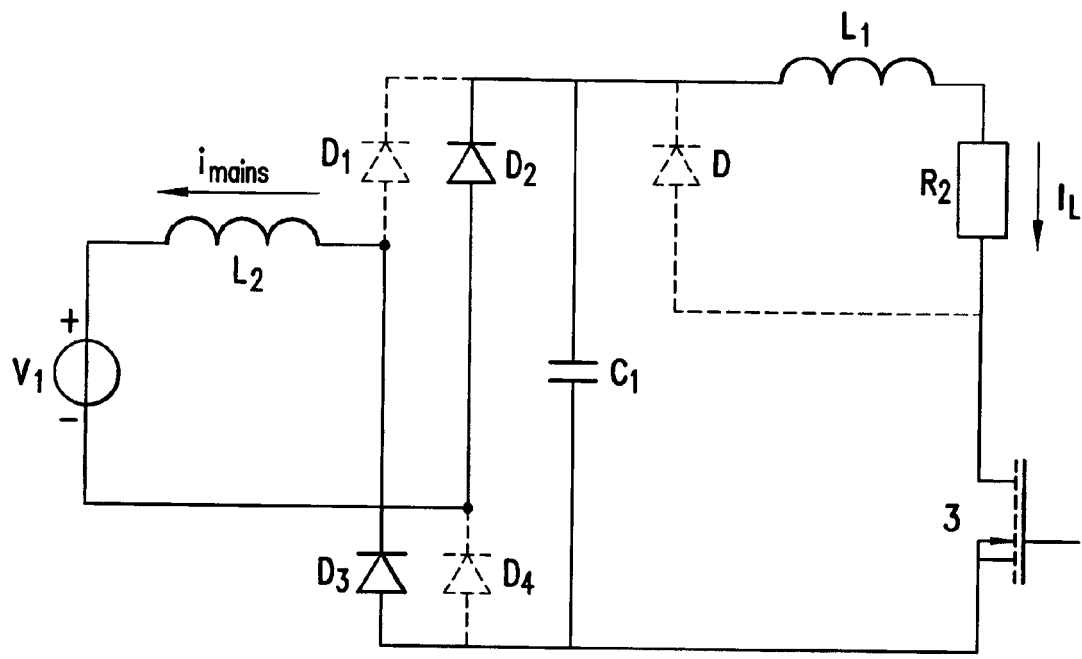
Figure 5:
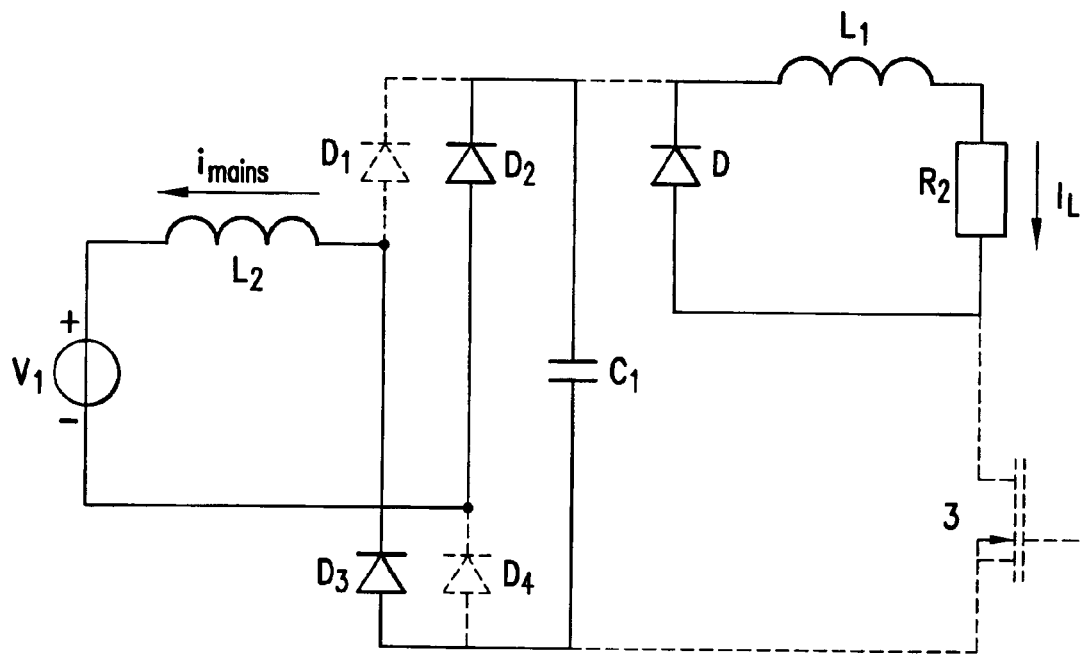
Figure 6:
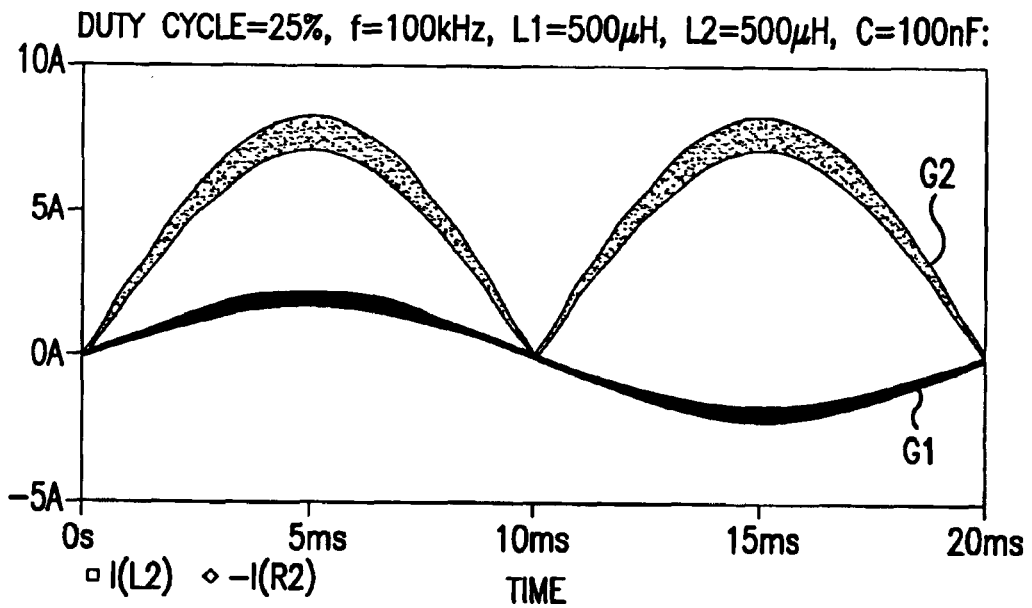
FIGS. 6–9 show graphical examples of the AC current of the power supply and the current of the load, respectively, for different duty cycles of the control signal according to an embodiment of the present invention.
Figure 7:
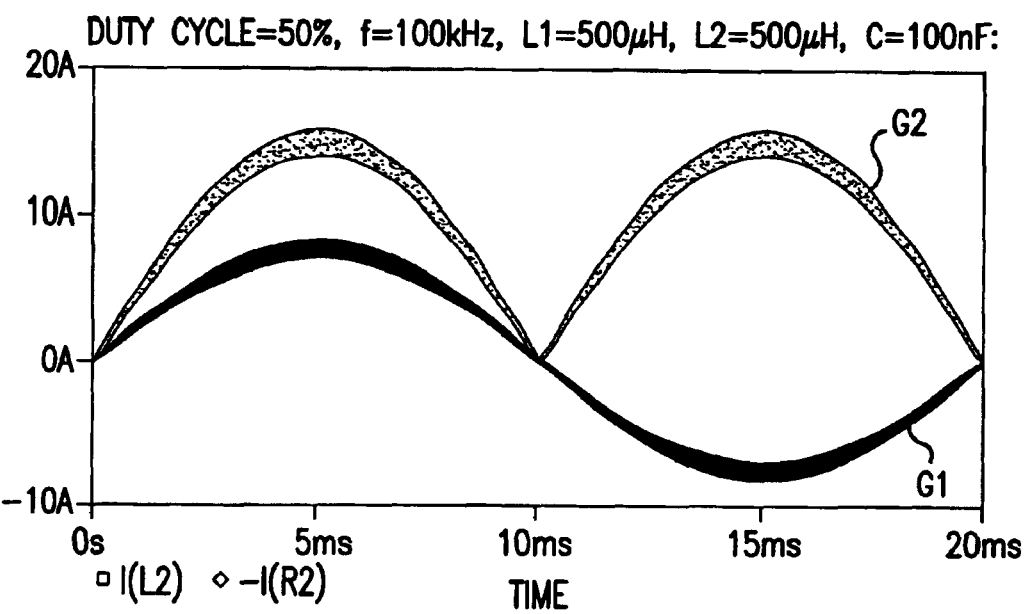
Figure 8:
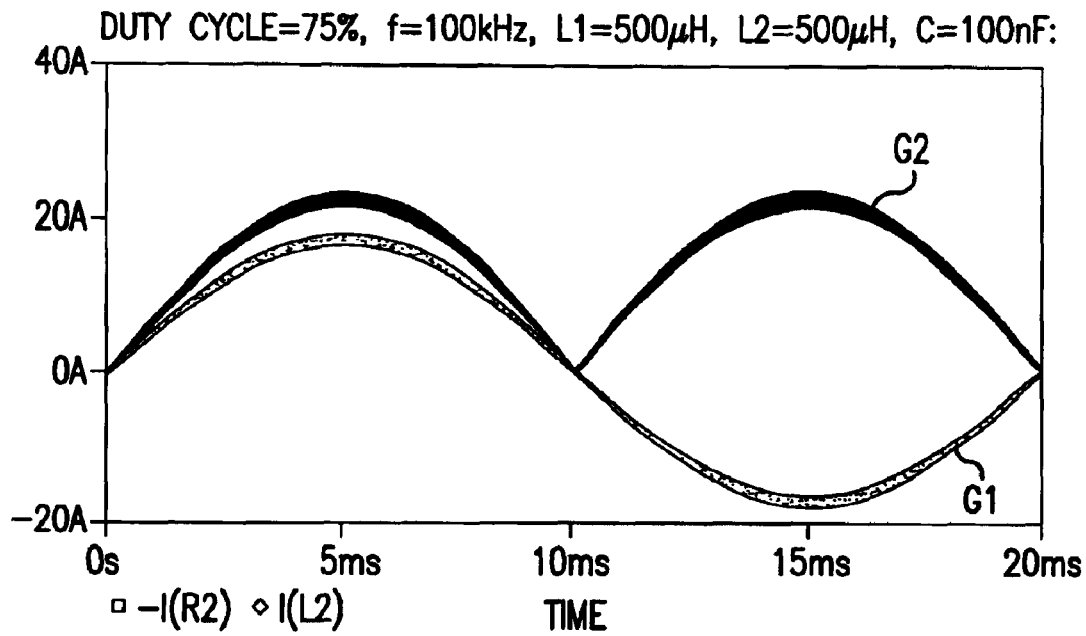
Figure 9:
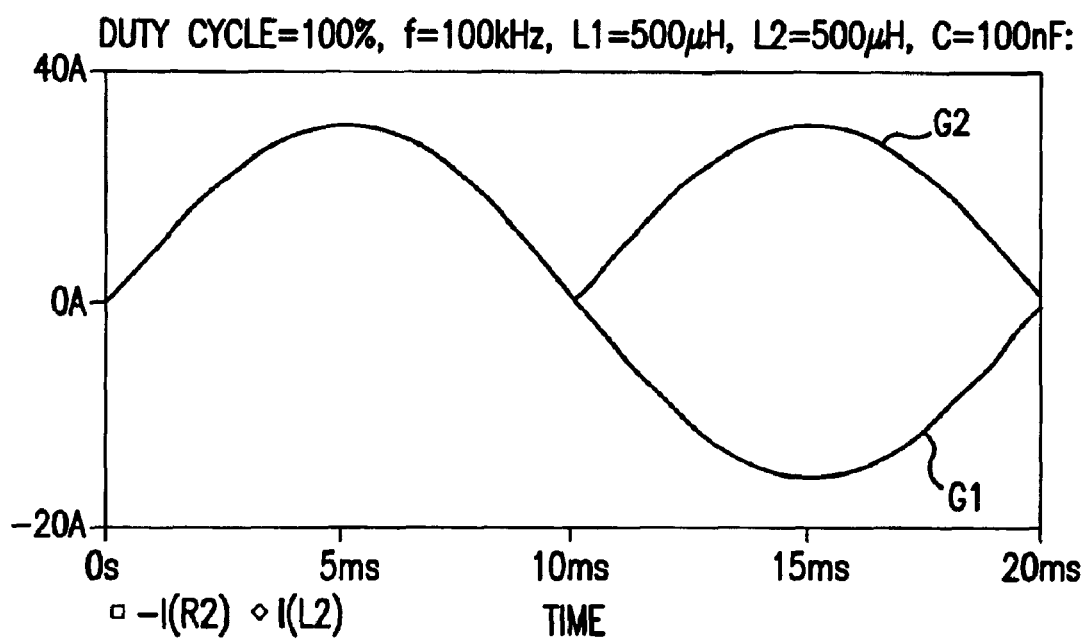

The third and fourth phases respectively shown in FIGS. 4 and 5 correspond respectively to the phases of FIGS. 2 and 3, except that the voltage V1 of the power supply 1 is negative (i.e., in a negative cycle of the sinusoidal signal) so that AC current of the power supply 1 will flow in a reversed direction through the other two diodes $D_2$ and $D_3$ of the rectifier bridge 6.

In the circuit of the apparatus described, the ohmic character of the load 2 is advantageously used in suppressing the harmonic distortions caused by the high frequency switching. As the harmonic distortion components are located at relatively high frequencies, they can be effectively suppressed by the suppressing circuit formed by the load 2 and the inductor 7.

It is noted that the rectifier bridge 6 can be any known bridge. The freewheeling element 10 has to be of a very fast recovery type in order to obtain a high efficiency. As indicated above, the frequency of the control signal from the controller 4 is preferably in the range of, e.g., 50–250 kHz.

The impedance value of the inductors 7 and 8 is preferably in the range of, e.g., 50–500 $\mu$H and the impedance of the capacitor 9 is preferably in the range of, e.g., 100 nF up to 2.2 $\mu$F. Good results have been obtained in experiments using the circuit diagram as shown in FIG. 1 where a switching frequency of 100 kHz, an impedance value of 500 $\mu$H for the first inductor 7, an impedance of 500 $\mu$H for the second inductor 8 and an impedance of 100 nF for the capacitor 9 are used. FIGS. 6–9 depict these results by showing examples of graphs showing the AC current of the power supply 1 and the load current ($I_L$) at the duty cycle of 25%, 50%, 75%, and 100% of the control signal, respectively. Here, the line G1 represents the AC current of the power supply 1 and the line G2 represents the load current. In this example, the resistance value of the load 2 was 10$\Omega$.

It will be understood that the invention is not restricted to embodiments with components having such values and that the embodiment shown can be varied in a number of ways within the scope of the following claims.

What is claimed is:

1. A method for controlling power supplied from an AC power supply to an ohmic load, the AC power supply providing a sinusoidal output, the method comprising:

connecting the load to the AC power supply during a part of each period of the sinusoidal output, wherein the power supplied from the AC power supply to the load is varied by varying the duration of said part of each period, wherein the sinusoidal output is rectified and the rectified output is delivered to a series connection of a first inductor and the load, wherein the load is connected to and disconnected from the AC power supply at a frequency which is at least 500 times higher than the frequency of the AC power supply, and wherein the power supplied from the AC power supply to the load is varied by varying a time ratio of connecting/disconnecting the load.

2. The method according to claim 1, wherein the time ratio of connecting/disconnecting the load is varied according to a variable duty cycle of a control signal applied to a switch coupled with the load.

3. The method according to claim 2, wherein the frequency of the control signal is in the range of 50 kHz up to 250 kHz.

4. An apparatus for controlling power supplied from an AC power supply to an ohmic load, the apparatus comprising:

a switch for connecting the load to the AC power supply;

a controller for providing a control signal to the switch; and a rectifier bridge having an input and an output, the input being adapted for connection to the AC power supply and the output being connected to a series connection of a first inductor, the load and the switch, wherein the controller provides a control signal with a frequency which is at least 500 times higher than the frequency of the AC power supply, wherein the switch is switched on and off by said control signal, and wherein the controller comprises a control element for varying the duty cycle of the control signal.

5. The apparatus according to claim 4, further comprising:

a freewheeling element connected parallel to the series connection of the first inductor and the load.

6. The apparatus according to claim 4, further comprising:

a second inductor series connected to the input of the rectifier bridge.

7. The apparatus according to claim 4, further comprising:

a freewheeling element connected parallel to the output of the rectifier bridge.

8. The apparatus according to claim 4, wherein the frequency of the control signal is in the range of 50 kHz up to 250 kHz.

9. The apparatus according to claim 5, wherein the freewheeling element is a diode.

10. The apparatus according to claim 5, further comprising:

a second inductor series connected to the input of the rectifier bridge.

11. The apparatus according to claim 10, further comprising:

a second freewheeling element connected parallel to the output of the rectifier bridge.

12. The apparatus according to claim 11, wherein the second freewheeling element is a capacitor.

13. The apparatus according to claim 4, wherein the rectifier bridge includes:

first and second diodes connected in series each other and coupled with the series connection of the first conductor, the load and the switch; and third and fourth diodes connected in series each other and in parallel with the first and second diodes.

* * * * *